United States Patent [19]

Shagoury

[11] Patent Number: 5,293,835
[45] Date of Patent: Mar. 15, 1994

[54] WILD BIRD FEEDING STATION WITH A CLUSTER OF BIRD FEEDERS AND BAFFLES WHICH PREVENT SQUIRRELS FROM REACHING THE FEEDERS

[76] Inventor: Paul B. Shagoury, 48 Fairmount Ave., P.O. Box 506, Hyde Park, Mass. 02136

[21] Appl. No.: 52,063

[22] Filed: Apr. 27, 1993

[51] Int. Cl.⁵ .............................................. A01K 5/00
[52] U.S. Cl. .................................................... 119/57.9
[58] Field of Search ................ 119/57.9, 52.1, 52.2, 119/52.3, 52.4

Primary Examiner—Gene Mancene
Assistant Examiner—Thomas Price

[57] ABSTRACT

A cluster of bird feeders on a wild bird feeding station and in particular, the use of baffles to prevent squirrels from reaching the bird feeders whether from above (trees or tree limbs) or from below (ground) and the use of a circular disk attached to the vertical pole as a circular bird feeder.

9 Claims, 7 Drawing Sheets

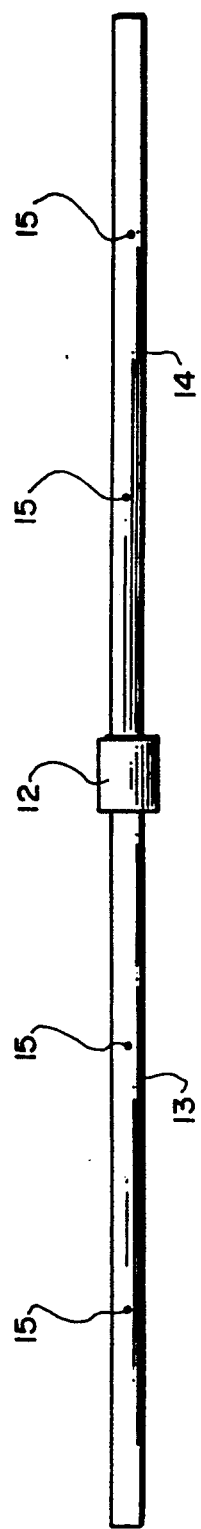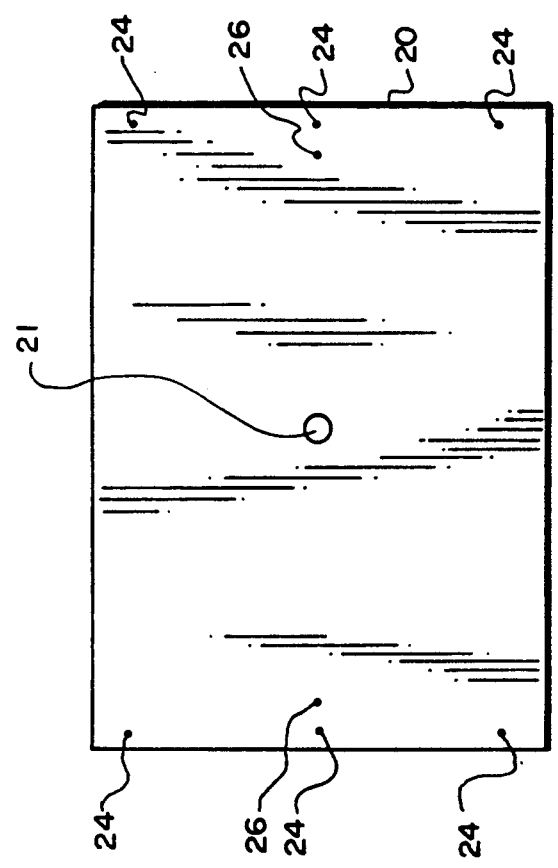

WILD BIRD FEEDING STATION WITH A CLUSTER OF BIRD FEEDERS AND BAFFLES WHICH PREVENT SQUIRRELS FROM REACHING THE FEEDERS

BACKGROUND OF THE INVENTION

1. Field of Invention

This invention relates in general to a cluster of bird feeders on a wild bird feeding station and in particular to the use of baffles to prevent squirrels from reaching bird feeders.

2. Prior Art

The hobby of feeding birds has been a hobby by bird watchers since the country was founded. It is America's second largest hobby after gardening. Many different types and sizes of bird feeders have been developed throughout the years. Some bird feeders were placed on top of poles, while others were suspended from tree limbs. Wherever you find bird feeders, you can be rest assured that the bird feeder will be frequented by squirrels. For generations, squirrels have always had the sense and ingenuity of gaining access to the food in a bird feeder and consuming most of the food within a short time period. As a result, bird watchers have had to constantly refill the bird feeders at great expense. Birds which were accustomed to, in need of, and became dependent on the birdseed in the bird feeders especially during the cold winter months found that the bird feeders would remain empty for long periods of time because the bird watchers became upset with the squirrels and refused to refill them, which resulted in the death of some of the birds due to starvation. It is commonly known that if a person starts to feed birds during the cold winter months and the birds become dependent upon the birdseed for food, the bird watcher must continue to feed the bird during the cold winter, or else they could die of starvation. Birds sometimes need to eat nearly 50% of their body weight on a daily basis to survive. This resulted in a lower bird population during the spring and summer when the birds were needed to do their share in the environment and nature, by eating harmful insects.

Squirrels have been the major problems with bird feeders. They would dominate a feeder for hours, thus preventing hungry birds from reaching the feeders. When one squirrel left a feeder, another squirrel was ready to take its place at the feeder, thus preventing the birds from getting on the feeder.

There have been many attempts to make squirrel-proof bird feeders to prevent the theft of the bird seeds by squirrels, but they have proven to be not particularly successful.

In order to provide background information so that the present invention may be completely understood and appreciated in its proper context, reference is made to a number of prior art patents as follows:

U.S. Pat. No. 2,856,898 Doubleday
U.S. Pat. No. 2,891,508 Bower
U.S. Pat. No. 3,590,780 Dunbar
U.S. Pat. No. 4,030,451 Miller
U.S. Pat. No. 4,207,839 Barry
U.S. Pat. No. 4,323,035 Piltch
U.S. Pat. No. 4,767,088 Fielder
U.S. Pat. No. 4,821,681 Tucker
U.S. Pat. No. 5,044,319 Blasbalg Doubleday teaches a dome-shaped baffle which is composed of many parts and electric shock, which could become defective and expensive. It accommodated only one bird feeder and does not teach the present invention of having a cluster of bird feeders in a contained area.

Bower teaches a squirrel guard that has a large opening in the center. The large hole is covered by coiled springs. The coiled springs kept the guard in a level position. It could accommodate only one bird feeder and not a cluster of bird feeders. Instead of coil springs, in the present invention, the lower pole baffle has a center cut out and removed with a diameter slightly greater than the diameter of the pole. This allows the baffle to pivot and sway on a plastic bushing. The baffle is held in position by a simple 2¾ plastic clamp and rests on a plastic bushing and not by a heavy coil spring.

Dunbar teaches nothing of the present invention, as it is a drum shaped guard suspended above one bird feeder.

Miller teaches a pre-sloped dome which is suspended above one bird feeder, which has a flat container as a bird feeder and does not teach the present invention.

Barry teaches a bowl bird feeder with a pre-sloped dome to prevent squirrel intrusion. It does not teach or prevent squirrels from getting on the regular bird feeders commonly in use today.

Piltch teaches a cylinder that rotates when the squirrel steps on it and causes it to fall to the ground, and does not teach the present invention.

Fielder teaches a squirrel guard that prevents squirrels from climbing up the pole to the bird feeders, which consists of a preformed and moulded squirrel guard with a curvature and a flat flange portion that has a re-entrant inner portion with a reverse curvature, extending to a central opening sized to fit the center pole with a loose fit and held in place by an O ring. This is too mechanical and costly, as it has too many parts attached to it to keep the squirrel guard in its proper position. In the present invention the lower pole baffle is very simple in comparison, composing only of a flat sheet metal or aluminum baffle with a circular cut from the center slightly larger than the diameter of the upright pole and is held in position by a plastic bushing and plastic clamp. The clamp may be moved up or down the pole thus allowing the lower pole baffle to be adjusted to any desired position on the pole.

Further, Fielder does not teach us the present invention because once the squirrels reach the structures from above (such as trees, tree limbs, etc.) the squirrels could easily have access to any of the bird feeders on the Fielder's prior art. The present invention has a sheet baffle on top of the pole to prevent squirrels from coming down the pole or jumping onto a feeder.

Tucker teaches a dome-shaped baffle over a flat feeder which is similar to Miller. It does not teach or prevent squirrels from going on the regular bird feeders commonly in use today.

Blasbalg does not teach the present invention as it is a large container holding the same type of bird seed. The bird feeder is so large that birds on the back side of the feeder cannot be easily viewed by the bird watcher.

Whatever the precise merits, features and advantages of the above cited references, none of them achieve or fulfill the purposes of preventing squirrels from reaching a cluster of bird feeders in one contained feeding station, which is the present invention.

There have been bird feeders developed with a domed baffle above the bird feeder on top of the pole and a baffle on the lower end of the pole to prevent squirrels from going up the pole. Even in this arrangement, when the squirrel landed on the domed baffle and it gave way towards the pole, the squirrel once near the pole, would merely jump on the pole and work its way up the pole to the bird feeder. This arrangement was for only one bird feeder. If the bird watcher desired to attract several types of birds with different kinds of bird feed, such as sunflower or thistle, suet, etc., a pole must be erected for each bird feeder and the feeder must be away from the trees and tree limbs. The present invention prevents the squirrels from reaching the bird feeders even from trees or tree limbs.

Anyone who has attempted to prevent squirrels from gaining access to bird feeders can attest to the cunning and ingenuity of the squirrels in overcoming almost any obstacles, no matter how difficult it was for them.

If any of the prior arts with either a preshaped dome baffle or baffle above the bird feeder were individually hung on a plan T structure and a squirrel guard was placed on the lower end of the center pole to prevent the squirrels from going up the pole, it would still fail to achieve what the present invention accomplished because if the T structure were near trees or tree limbs, squirrels would merely jump on the upright structure from above and could easily have access to all the bird feeders by climbing down the center pole and jumping onto the nearest bird feeder thereby bypassing the individual baffles on top of each of the bird feeders.

Also, a dome shaped baffle would curve in towards the feeder if the squirrel was on top of the domed baffle and as the squirrel is on its way down between the feeders, it could easily jump onto the bird feeder beside it thus gaining access to the bird feeders from that position. The present invention does not allow a squirrel to gain a firm footing (as in a preshaped dome feeder) as the slightest touching of the baffle by a squirrel will cause the sheet baffle to sway and pivot, thus preventing the squirrel from getting any kind of secured footing in its attempt to jump onto any of the bird feeders. Any attempt by the squirrel to gain a secured footing would cause the squirrel to lose its balance and fall to the ground.

SUMMARY OF THE INVENTION

The principal object of the present invention is to provide a wild bird feeding station for a cluster of bird feeders with baffles which prohibits the squirrels from gaining access to the bird feeders whether from above (trees or tree limbs), or from below (ground).

It also is an object of the present invention to provide a wild bird feeding station supporting a cluster of bird feeders that are only for wild birds.

Another object is to allow the bird watcher to transfer his present bird feeders to the present invention without incurring the costs of purchasing new bird feeders.

It is also an object of the present invention to provide such a structure which is of simple, inexpensive construction.

Another object is to provide such a structure that can be assembled quickly and easily.

Another object of the present invention is to provide a squirrel-proof bird feeding station that is strong and durable, has a minimum number of parts, simple, easy and quick to assemble and inexpensive to manufacture.

Another object of the present invention is to have a cluster of bird feeders in a contained area for easy and quick access to the bird feeders for easy refilling.

Another object of the present invention is to have a cluster of bird feeders to allow the bird watchers to view several different varieties and species of wild birds at the same time in a contained area.

Another object of the present invention is to provide a wild bird feeding station that protects both the birds and feeders from rainstorms and/or inclement weather.

Other objects, features and advantages of the invention will become apparent as the description thereof proceeds when considered in connection with the accompanying illustrative drawings.

The present invention comprising of 1" tubing, made out of either aluminum or metal. The bird feeding station is T-form in structure. A pole 95" tall of which 1 foot is cemented into a bucket at the lower end is secured to a T-coupling at the upper end.

Secured to the T-coupling on the upper end are two horizontal poles each 30" in length.

Small perpendicular holes are drilled on the horizontal poles at intermittent points along the horizontal poles for the hanging and securing of heavy wires which in turn serves as a hook for the feeders and holding the sheet baffle in position.

The sheet baffle is made out of sheet metal or aluminum comprising of three sheets which are secured together with fasteners and is 95" in length. The center sheet is 20" wide and 28" long and has a center hole of approximately 2" in diameter. The center sheet has two sheets 20" wide and 24" long which are fastened on each end. The assembled sheet baffles which are now 20" wide and 95" in length are secured and held in position to the horizontal tubing on top of the T-structure by means of heavy wire hooks and bushings. Holes are drilled in the sheet metal baffle to correspond with the small perpendicular holes on the horizontal poles secured to the T-coupling for acceptance of the heavy wire hooks and bushings on which the bird feeders hang.

On each of the heavy wire hooks are two bushings approximately 1⅛" in length. A bushing is inserted onto the heavy wire which rests on the foot of the hook. The opposite end is fed into the corresponding hole on the sheet baffle, as another bushing is inserted into the heavy wire hook prior to its insertion into the corresponding hole on the horizontal pole. After the heavy wire hook is threaded through the sheet baffle and horizontal pole, the heavy wire is pulled up tight to the top end of the horizontal pole and is bent over the horizontal pole to secure the heavy wire hook permanently in position. This process is repeated on all the heavy wire hooks. Once all the hooks are attached to the horizontal poles, the T-coupling is slipped onto the male end on top of the pole and tightened by an allen wrench.

Once secured in position, the sheet baffle will sway and pivot if a squirrel attempts to land on it thus preventing squirrels from getting a secured footing on the sheet baffle in their attempt to jump onto a bird feeder.

The 20" width of the sheet baffle exceeds the reach of the squirrel in any position on the sheet baffle which thus prevents a squirrel from reaching any of the bird feeders under the sheet baffle. The squirrel is able to land on the horizontal poles from above such as trees and limbs and secure itself to the horizontal pole. However, in its attempt to overcome the sheet baffle, it will secure its hind legs to the horizontal poles, but once the squirrel releases its hind legs from the horizontal poles, and is on the sheet baffle, the sheet baffle will pivot and sway causing the squirrel to lose its balance and fall to the ground.

To prevent squirrels from climbing up the center pole (from the ground), a circular baffle (hereafter referred to as the "lower pole baffle") is inserted on the center pole prior to securing the two sections of the center pole together by a female coupling. (Center pole is in two sections for shipping.)

The lower pole baffle is approximately 20" in diameter, has a center hole slightly larger than the diameter of the vertical pole and is secured in position by a plastic bushing and a plastic clamp. The lower pole baffle will also sway and pivot either by wind movement or mere touching, thus preventing squirrels from climbing up the center pole. The 20" lower pole baffle is also beyond the reach of the squirrel in its attempt to reach over it. The smooth surface of the lower pole baffle prevents the squirrel from obtaining any firm grip or footing to overcome the baffle and thus is prevented from going up the vertical pole.

Squirrels are now unable to reach any of the bird feeders with the present invention. They are prevented from reaching the feeders from the ground by the lower pole baffle and squirrels are unable to reach any of the feeders from above (trees or branches) as the 20" width of the sheet baffle is beyond the squirrel's reach on any point on the sheet baffle in its attempt to reach a bird feeder. After several failed attempts, a squirrel will no longer make any further attempts to reach any of the bird feeders.

The squirrel-proof wild bird feeding station attracts several varieties of birds to the different kinds of food on the feeders in a confined area. It is truly amazing for bird watchers to see the flow of several varieties of birds in a confined area, as for years squirrels have dominated bird feeders—taking the bird food from the wild birds. The present invention has now prevented the squirrel-domination of bird feeders.

The present invention does not require the bird watcher to purchase new bird feeders, as in most instances the bird watchers' present bird feeders could be used by suspending them from the hooked end of the heavy wire. For large bird feeders, a wider sheet baffle may be necessary.

To attract the beautiful bright red cardinal or mocking bird to the station, birds that have a dislike to perch on some types of bird feeder, the inventor designed a flat, metal circular bird feeder 16" in diameter, in which a hole of 1" in diameter or the exact diameter of the pole is removed from the center for a tight fitting against the upright pole. The circular feeder is placed approximately 4" above the lower pole baffle. The circular feeder also has a baffle placed approximately 6" above it to prevent rainwater from entering the feeder or a squirrel from landing on the feeder on its way down from the sheet baffle. Both the circular feeder and the upper pole circular baffle are placed on the upright center pole prior to it being assembled to straight coupling on the lower pole. The 1" center cut on the feeder allows for a snug fit against the 1" diameter of the center pole and is held firmly in position by an assembly above and below the circular feeder consisting of a plastic bushing, circular plastic clamp that is clamped tight by a metal hose clamp. The upper pole baffle may be adjusted in height to prevent larger birds such as pigeons, etc. from landing on the circular bird feeder. Cardinals and mockingbirds are very much attracted to the circular bird feeder. A full bright red cardinal and its colorful mate on the circular feeder is a sight to behold.

Within the present invention a sixth bird feeder, namely a suet feeder for the attraction of woodpeckers, white-breasted nuthatches, brown creepers, or birds attracted to suet is easily secured to a hook clamped in the opening of the plastic clamp and held in position by the metal hose clamp near the top of the center pole under the sheet baffle.

The contained wild bird feeding station has been long overdue. With the present invention, all you can see are the several varieties and species of wild birds flying about to their respective bird feeders for their desired food. Bird feeders under the present invention are now only for the wild birds and not for the squirrels which previously have dominated bird feeders. Bird watchers will save considerable sums of money on the purchase of birdseed, as birds alone do not consume very much birdseed for their survival. Wild birds (especially during the cold winter months) will now be able to be kept fed on a daily basis, without interference by the squirrels. The sight of beautiful birds will now be enjoyed by bird watchers. Bird watchers now may easily fill the feeders which are in a contained area. This is especially desirable during the cold winter days.

BRIEF DESCRIPTION OF THE DRAWINGS

FIG. 2 is the top view of the horizontal poles.

FIG. 3 is the top view of center sheet baffle.

DETAILED DESCRIPTION OF INVENTION

Figure 1:
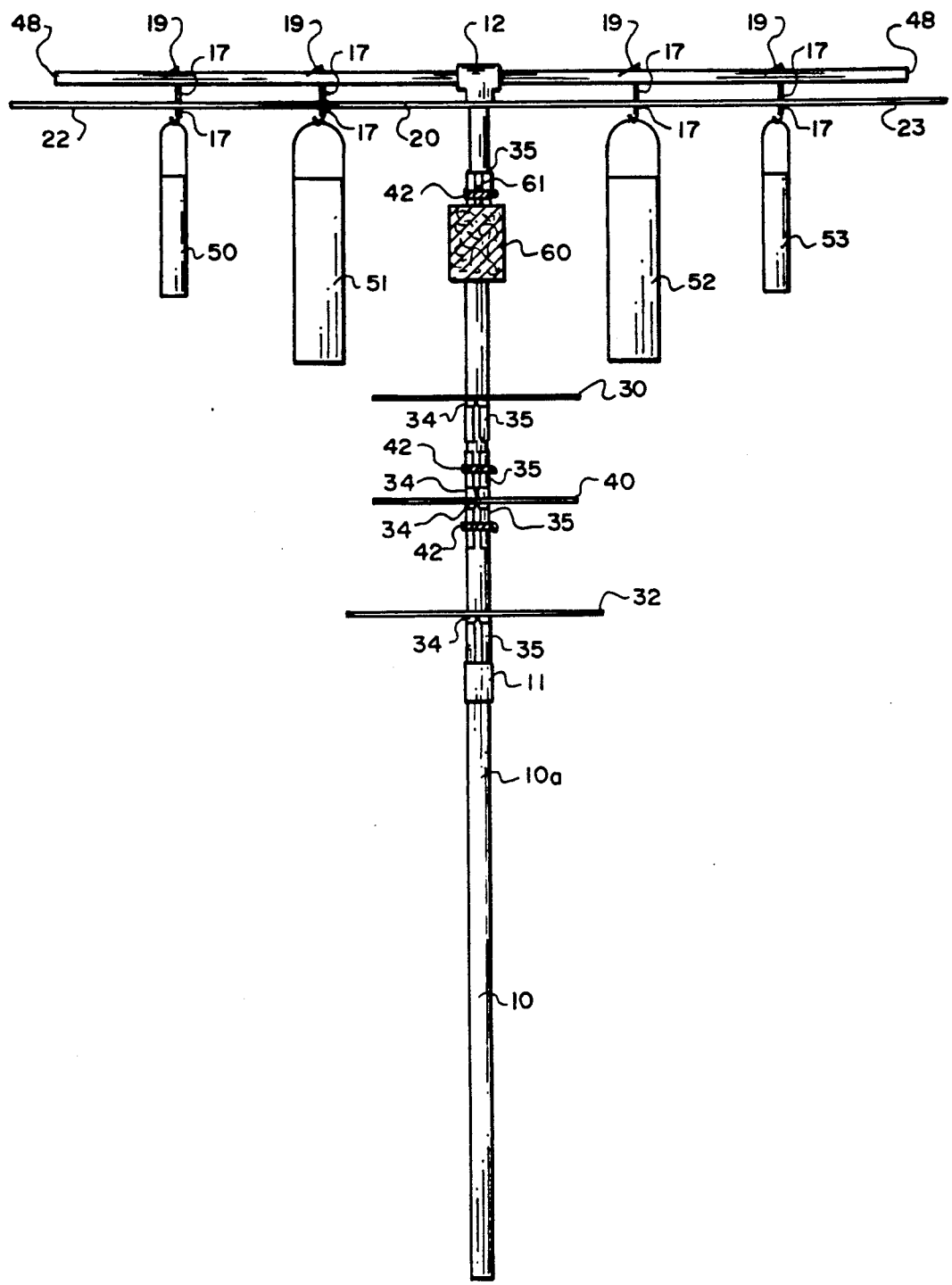
FIG. 1 is a perspective view of assembled wild bird feeding station.

In FIG. 1 we see a preferred embodiment of the wild bird feeding station wherein flat sheet baffle and flat disks are a means that prevent squirrels from reaching the birdfeeders. Such embodiment includes a tubular verticular center support pole 10 preferably formed in two sections 10a and 10b so that it may be easily shipped. The two sections are metal poles preferably of 1" O.D. consisting of metal. The upper end of 10a is coupled to the lower end of 10b by straight coupling 11 and tightened by an allen wrench. The lower end of 10a is preferably cast in cement poured into a small container so that it may be anchored and set in a hole in the ground.

The upper end of the vertical center pole 10, namely 10b is coupled to a T-coupling 12 and which is also tightend by an allen wrench.

The overall length of center pole is 8 feet, with 7 feet above ground and 1 foot in the ground.

Horizontal poles 13 and 14 are 30 inches in length which are coupled into ends of coupling 12 causing the said horizontal poles to be at right angles to the vertical center pole. The ends of the horizontal poles are capped with plastic cap 48.

Figures 4, 5:
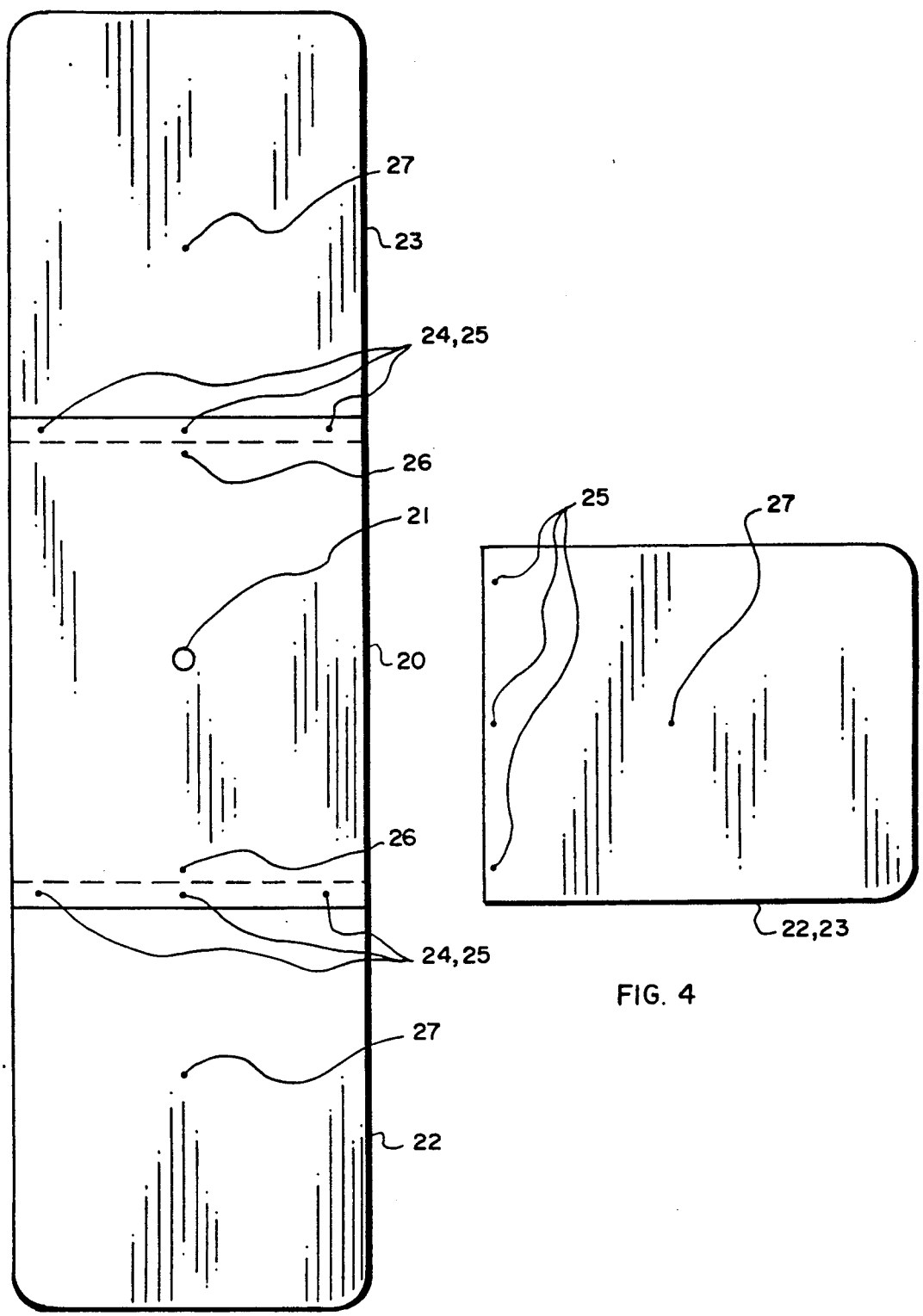
FIG. 4 is the top view of the end sheet baffles.
FIG. 5 is the top view of the center sheet baffle secured to end sheet baffles.
Figure 6:
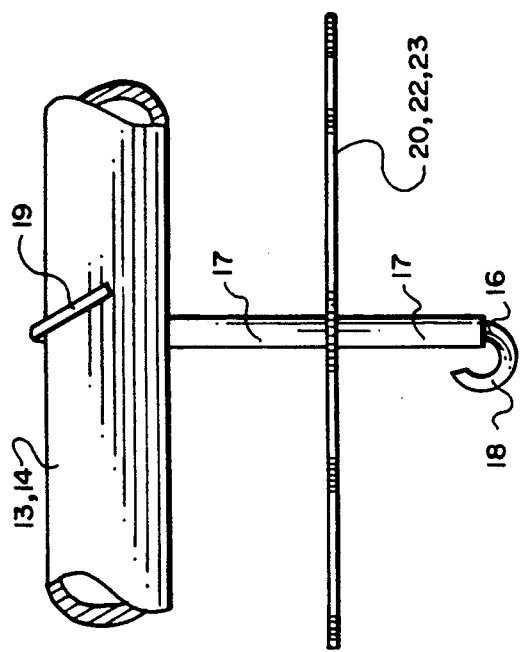
FIG. 6 is the exploded view of heavy wire with a bushing on the hook end and with a bushing between the sheet baffle and horizontal poles showing how the opposite end of heavy wire bent over horizontal poles.

Heavy wire 16 is placed in respective hole on the sheet baffle and then into their corresponding holes on horizontal poles 13 and 14 which are better illustrated in FIGS. 2, 5 and 6. Heavy wire 16 has an assembly consisting of two 1¼" bushings 17. One bushing 17 is placed on the heavy wire which rests at the base of the hook prior to its insertion into the respective hole of the flat sheet baffle. After the heavy wire is placed through the sheet baffle, another bushing 17 is then added to the heavy wire prior to its insertion to the corresponding hole on horizontal poles 13 and 14. The lower end of the hook is pulled up tight against bushings 17 and the horizontal poles and is held firmly in position by bending it over curved end of horizontal poles 13 and 14 which is fully illustrated in FIG. 6. This process is repeated on all other hooks in the assembly. After all the heavy wire is bent on the curve end of the horizontal poles, it causes the sheet baffle to be permanently fixed in position to the horizontal poles. Bird feeders 50, 51, 52 and 53 are attached and hung from hook end of the heavy wire 16. This is further illustrated in FIG. 6.

The center pole also has two flat circular disks as center pole baffles. One on the upper and the other on the lower end of the pole. They are also made out of either sheet metal or aluminum. The upper center pole baffle 30 prevents squirrels that are falling from the sheet baffle from landing onto the circular bird feeder and helps prevent rainwater from entering the circular bird feeder. The lower center pole baffle 32 prevents squirrels from climbing up the vertical pole 10. Both upper and lower center pole baffles are held in position by a center pole bushing 34 and by a plastic clamp 35 which are snapped onto the center pole, which is further illustrated in FIG. 9. Clamp 35 is approximately 2¾" in length. Clamp 35 may slide up or down the center pole to hold the upper and lower pole baffles to any desired position on pole 10.

Figure 10:
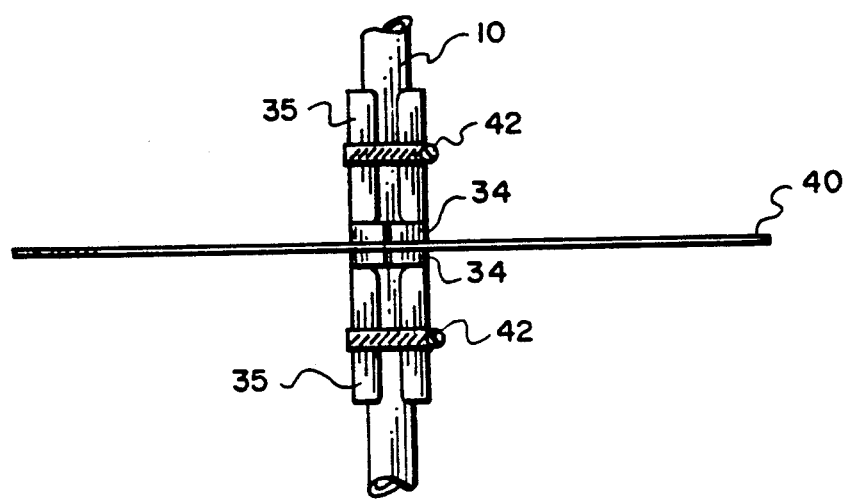
FIG. 10 is the side view of circular bird feeder held in position with plastic bushings, plastic clamps and metal hose clamps.

Above the lower center pole baffle 32 is a side view of a flat circular bird feeder 40 which is held firmly in position by a metal hose clamp tightened around plastic clamp 35 which is fully illustrated in FIG. 10. Plastic bushings 34 and clamps 35 are above and below the circular bird feeder. Clamps 35 are pressed firmly against bushings 34 and hose clamps 42 are tightened to keep the circular bird feeder firmly in position. The upper center pole baffle 30 is positioned about 6 inches above the circular bird feeder 40.

Figure 13:
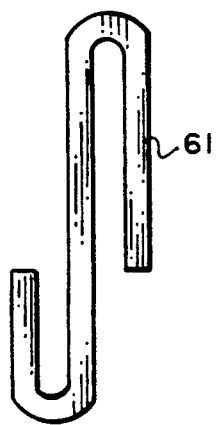
FIG. 13 is the suet holder.

Behind suet feeder 60 is a heavy wire 61 which is illustrated in FIG. 13 is held firmly in position by a hose clamp 42 tightened around plastic clamp 35 which in turn holds the caged suet feeder in position.

FIG. 2 shows the top view of horizontal poles 13 and 14 coupled by T-coupling 12 which has holes 15 drilled perpendicularly and at intermittent points along the said horizontal poles to accept the heavy wire 16 and its assembly.

FIG. 3 is the top view of center sheet baffle showing center hole 21 which is cut larger in diameter than the center pole so that it may hang without interference with the center pole. Holes 26 are for the acceptance of heavy wire 16 and its assembly. Holes 24 are for the acceptance of fasteners so that it may be securely fastened to the end sheet baffles which are better illustrated in FIGS. 4 and 5.

FIG. 4 is the top view of the end sheet baffles 22 and 23. Holes 27 are for the acceptance of heavy wire 16 and its assembly and holes 24 are for the acceptance of fasteners so that it may be securely fastened to the center sheet baffle, all of which are illustrated in FIG. 5.

FIG. 5 is the top view of the center sheet baffle 20 assembled and fastened to end sheet baffles 22 and 23 prior to its assembly to horizontal poles 13 and 14.

FIG. 6 is an assembly of one heavy wire 16. It is a detailed view of the heavy wire 16 showing the two bushing 17 in position on the heavy wire 16. At the lower end of heavy wire 16 we see hook 18 from which bird feeders 50, 51, 52 and 53 are hung. The upper end of the heavy wire 16 with bushing 17 at its lower end is threaded through the holes 26 or 27 on the bottom of the sheet baffle 20 or 22 or 23 thereafter another bushing 17 is slipped onto the heavy wire and then threaded through bottom and top of the designated holes 15 on the horizontal poles 13 or 14. To secure it firmly in position, the opposite end of the heavy wire is pulled up tight against hook 18 and bushings 17 and then bent over the curved end of horizontal poles 13 or 14.

Figure 7:
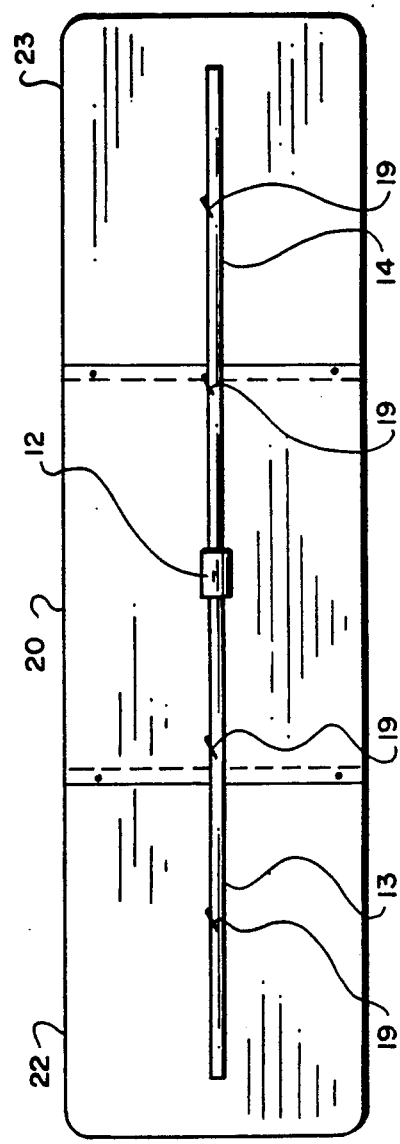
FIG. 7 is the top view of horizontal poles attached to sheet baffles which is kept in position by the opposite end of the heavy wire hooks bent over the horizontal poles.

FIG. 7 is the top view of the fully assembled flat sheet baffle 20, 22 and 23 to horizontal poles 13 and 14 by means of heavy wire 16. With the sheet baffle 20, 22 and 23 thus assembled no space is left between the center or end sheet baffles. A squirrel is unable to lift one end of the sheet baffle and slide underneath to a bird feeder. If a squirrel reached the top of the structure from above such as from trees or tree limbs, the squirrel would be unable to reach a bird feeder hung below sheet baffle 20, 22 and 23 which are hung on hook 18 because the width of the baffle is longer than the reach of the squirrel. If the squirrel attempts to reach a feeder, while on the horizontal poles and then goes on the sheet baffle, it will pivot and sway thus preventing a squirrel from getting a secured footing in its attempt to jump or reach a bird feeder. Any attempt to reach a feeder will cause the squirrel to lose its balance and fall to the ground because of the sway and pivot of the sheet baffle.

Figure 8:
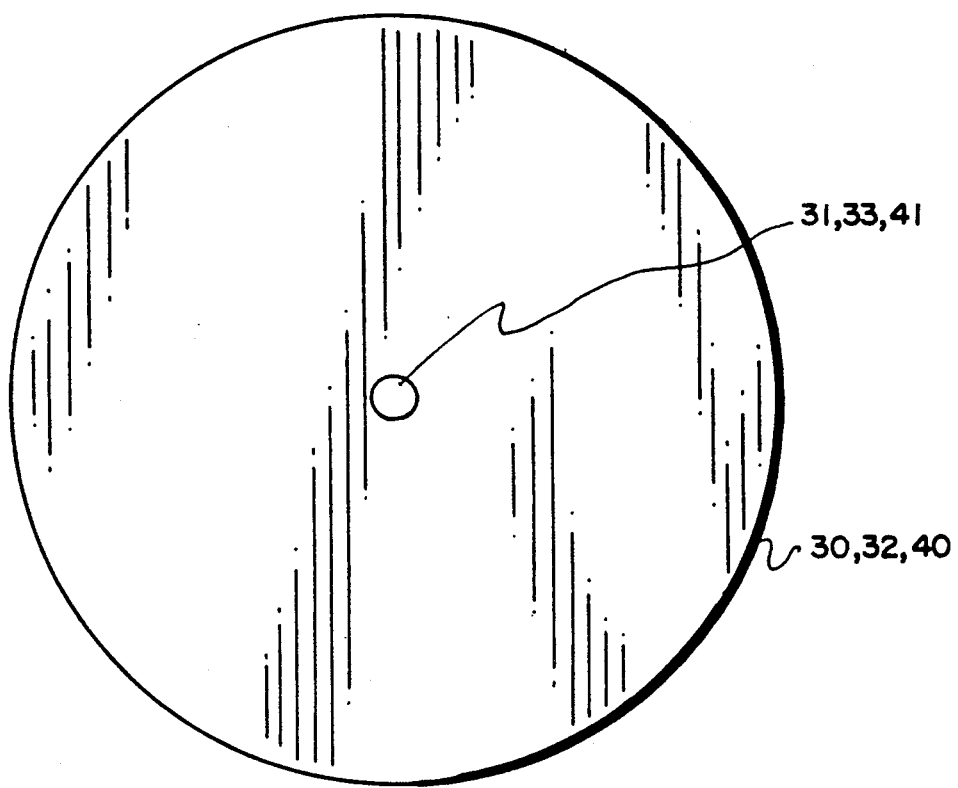
FIG. 8 is the top view of upper and lower center pole baffles and circular bird feeder.

FIG. 8 is the top view of the upper and lower center pole baffle 30 and 32 and circular bird feeder 40 In the baffles 30 and 32 the center hole is cut slightly larger than the diameter of the center pole so that the baffles will sway and pivot when it is touched. However, the center hole for the circular bird feeder 40 is the same size as the diameter of the center pole 10 so that it will be a tight fitting when slipped over the center pole 10b prior to its coupling with straight coupling 11.

Figure 9:
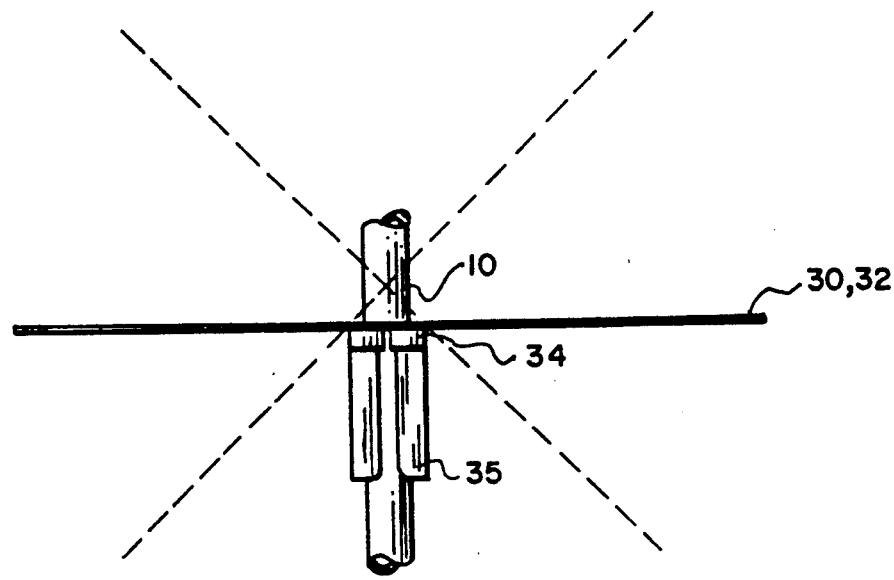
FIG. 9 is the side view of the upper and lower center pole baffle which is held in position by a bushing and plastic clamp.

FIG. 9 is the side view of the upper and lower center pole baffle. It shows how upper center pole baffle 30 and lower pole baffle 32 are held in position by plastic clamp 35 while resting on plastic bushing 34 on center pole 10. It also shows how clamp 35 is firmly clamped around center pole 10. Clamp 35 will not slip or move unless pressure is applied. Once pressure is applied to clamp 35, it may be moved up or down the center pole 10 to any desired position.

FIG. 10 is the side view of the circular bird feeder 40 showing a tight fitting on the 1" diameter of center pole 10. The circular feeder is slipped over center pole 10b prior to its coupling with coupling 11. Circular bird feeder 40 is held in position by a metal hose clamp tightened around plastic clamp 35. Plastic bushing 34 and plastic clamps 35 are above and below the circular bird feeder. Clamps 35 are pressed firmly against bushing 34 and hose clamps 42 are tightened to keep the circular bird feeder firmly in position.

Figure 11:
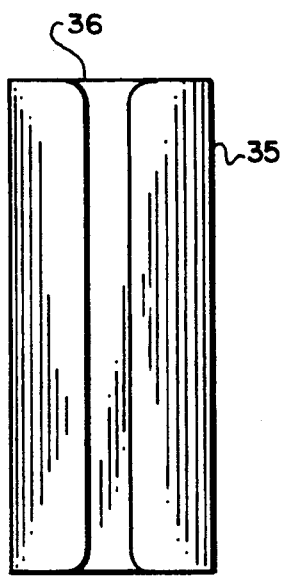
FIG. 11 is top view of plastic clamp.

FIG. 11 is the front view of plastic clamp 35 showing a curve edge 36 for easy snapping onto center pole 10.

Figure 12:
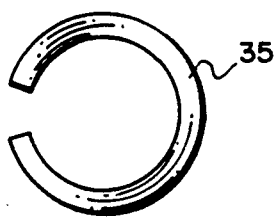
FIG. 12 is the front view of plastic clamp.

FIG. 12 is the top view of plastic clamp 35 showing a small opening in clamp 35. Once clamp 35 is snapped onto center pole 10 it would be firmly and securely attached to center pole.

FIG. 13 is suet holder hook 61 which is inserted in the opening of clamp 35 and then clamped tight by hose clamp 42. A caged suet feeder 60 is then inserted onto hook 61 to hold it in position.

With the present invention bird watchers are now able to have a cluster of bird feeders in a contained area for the feeding and viewing of wild birds. Squirrels are no longer able to reach and dominate the bird feeders or take the bird food. It is low cost, simple and easy to assemble.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detail description but rather by the claims appended hereto.

I claim:

1. A support for squirrel-proof wild bird feeding station for a plurality of bird feeders comprising:
   a vertical pole, one end of which is adapted to be anchored in the ground, the other end having a male end which is mated to an end of a dual female coupling,
   a vertical extension having a proximal end coupled to the other end of said dual female coupling,
   a distal end of said extension is joined to the bottom end of a T-coupling,
   two horizontal poles of equal lengths, each pole having one end with a male end joined to the T-coupling causing said horizontal poles to be at right angles to the vertical pole and extension,
   a plurality of small drilled holes positioned perpendicularly and at intermittent equal points along said horizontal poles to form a means for inserting and securing a heavy wire in each hole, each heavy wire having a hook on one end,
   a flat sheet positioned below said horizontal poles and having a circular opening of a diameter slightly greater than the diameter of the vertical extension, said flat sheet positioned along said vertical extension and is flexible so as to allow said flat sheet to waver and pivot about said vertical extension,
   two additional flat sheets fastened to opposite ends of said flat sheet to form end baffles,
   said end baffles and said flat sheet including a plurality of openings which correspond with said perpendicularly drilled holes, each opening receiving said heavy wire extending therethrough,
   said heavy wires having a hook end about said other end attaching and supporting a respective bird feeder,
   two flat circular disks including a center opening for receiving said vertical pole, and being flexible so as to allow said disks to waver or pivot about said vertical pole,
   each circular disk having a plastic bushing for joining said disks to said vertical pole.

2. A support for a squirrel-proof wild bird feeding station for a plurality of bird feeders as set forth in claim 1 wherein a pair of cylindrical bushings are provided on each heavy wire for floatably and pivotably joining said end baffles and said flat sheet.

3. A support for a squirel-proof wild bird feeding station for a plurality of bird feeders as set forth in claim 2 wherein said cylindrical bushings extend through said drilled holes of said horizontal poles.

4. A support for a squirrel-proof wild bird feeding station for a plurality of bird feeders as set forth in claim 3 wherein plastic clamps are provided on said plastic bushings and are snapped onto the vertical pole to form a means for supporting said circular disks.

5. A support for a squirrel-proof wild bird feeding station for a plurality of bird feeders as set forth in claim 4 wherein said plastic clamps are movable along the length of said pole for adjustment in position along the vertical center pole.

6. A support for a squirrel-proof wild bird feeding station for a plurality of bird feeders set forth in claim 5 wherein a hose clamp is tightened over said plastic clamps providing a means of permanently securing of said clamps.

7. A support for a squirrel-proof wild bird feeding station for a plurality of bird feeders as set forth in claim 1 wherein a flat rigid circular disk comprising a removed opening about its center thereof a diameter of the exact diameter of the vertical pole to form a circular bird feeder tray.

8. A support for squirrel-proof wild bird feeding station for a plurality of bird feeders as set forth in claim 7 wherein said flat circular disk is inserted between two plastic cylindrical bushings so it may be permanently secured in position by use of hose clamps.

9. A support for squirrel-proof wild bird feeding station for a plurality of bird feeders as set forth in claim 8 wherein said hose clamps are snapped onto the vertical pole for supporting said plastic cylindrical bushings.

* * * * *